Sept. 8, 1970     T. F. TUMICKI     3,527,409
EJECTOR SHROUD SYSTEM
Filed Oct. 11, 1968
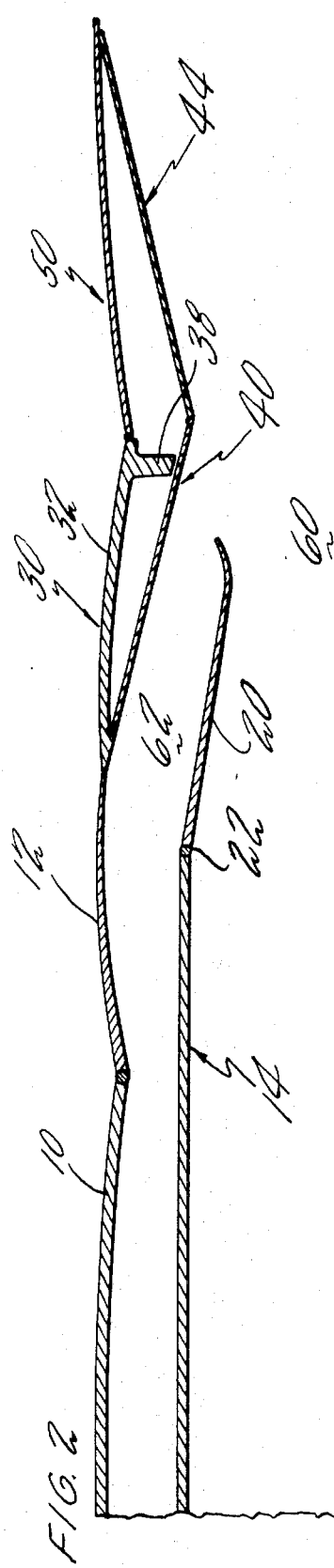
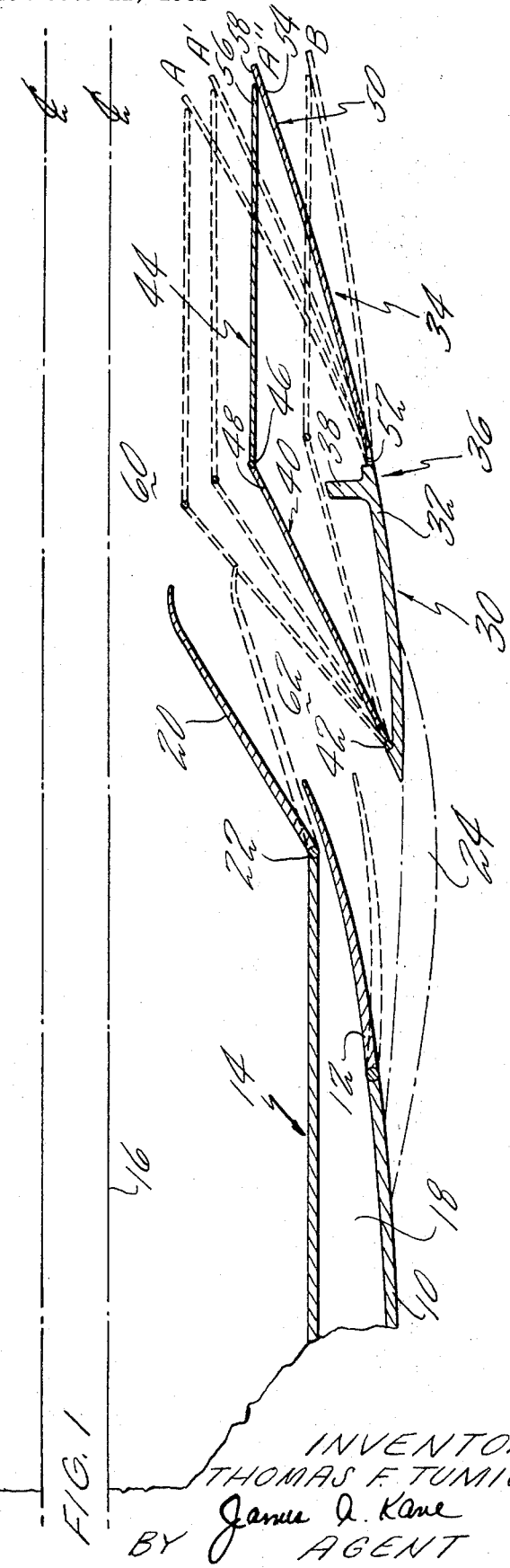
INVENTOR
THOMAS F. TUMICKI
BY James A. Kane
AGENT

United States Patent Office 3,527,409
Patented Sept. 8, 1970

3,527,409
EJECTOR SHROUD SYSTEM
Thomas F. Tumicki, Yantic, Conn., assignor to United Aircraft Corporation, East Hartford, Conn., a corporation of Delaware
Filed Oct. 11, 1968, Ser. No. 766,850
Int. Cl. B64c 15/06
U.S. Cl. 239—265.39                 7 Claims

ABSTRACT OF THE DISCLOSURE

An exhaust nozzle of the ejector type which operates over the entire flight regime of a gas turbine powered aircraft. The construction of the exhaust nozzle being such that it provides optimum performance for each Mach speed condition and provides the various exhaust configurations substantially automatically.

---

This application is reported as a subject invention under Government contract AF33(600)-41609.

BACKGROUND OF THE INVENTION

This invention relates to an exhaust nozzle for a gas turbine engine and more particularly to exhaust nozzles of the ejector type which provide optimum performance over all levels of a flight regime in an aircraft powered by a gas turbine engine.

The use of ejector type nozzles on gas turbine engines is well known in the prior art; however, a basic problem with the use of an ejector nozzle is to find a configuration which is compatible for use over the entire flight range of an aircraft or, more specifically, the operating range of the gas turbine engine which powers the aircraft. This problem arises because at take-off and subsonic flight conditions, the best exhaust nozzle configuration would be a converging nozzle with no extension or expansion surface downstream of the primary nozzle exhaust throat of the gas turbine engine. However, since the nozzle systems must operate over a flight range and into the supersonic condition, it is necessary from a performance standpoint to provide an expansion surface, downstream of the primary nozzle exhaust throat, to allow the average pressure of the exhaust jet to act upon. Therefore, it becomes necessary to provide a convergent nozzle for low pressure, low-speed flight conditions and a convergent-divergent nozzle for high-speed, high-pressure flight conditions. Typical prior art constructions are those contained in U.S. Pat. Nos. 2,989,845, 3,048,973 and 3,214,905.

These two requirements are somewhat incompatible when it is necessary to maintain an ejector nozzle system which is simple and of a lightweight construction. The prior art constructions either ignore this requirement or the necessity of providing an optimum performance over all the levels of the flight range, or if they are concerned with providing optimum performance, they do so by providing an extremely complex and heavy ejector nozzle system.

SUMMARY OF THE INVENTION

It is a primary object of the present invention to provide an ejector nozzle system which is compatible for use with a gas turbine engine powered aircraft over the entire flight regime of the aircraft while providing optimum performance over this flight regime; the nozzle ejector system being both simple and lightweight in construction.

The present invention is particularly suited for a gas turbine engine which employs a blow-in-door ejector system, with a primary exhaust nozzle positioned internal of the blow-in-doors. The blow-in-door system is a well-known construction, consisting of a plurality of pivotally attached or mounted flaps extending around the circumference of the engine. In the conventional construction employing a blow-in-door system, the blow-in-doors are spaced radially from the primary exhaust nozzle and form a secondary flow passage therebetween, the primary flow passage being from the primary exhaust nozzle. The ejector nozzle shroud construction of the present invention is positioned downstream of the blow-in-door ejectors and is attached to the engine housing or airframe by any conventional means. The nozzle ejector shroud comprises a fixed shroud section and a plurality of movable shroud sections. As hereinbefore mentioned, one of the objects of the present invention is to provide a lightweight construction, and to this end, the actuation means of the present invention may be one which employs the pressure differential existing between the primary jet flow and the ambient flow around the nozzle ejector shroud housing. By employing the pressure differential therebetween, the flight conditions determine the nozzle position and contour of the movable shroud section, hence providing an automatic ejector nozzle system. It should be clear that an external actuation system may be employed to position the movable nozzle shroud sections; however, this would add additional weight to the overall system and would not necessarily be a preferred embodiment of the present invention. However, it is recognized that in some applications, an external actuation system may be necessary.

It has been determined that at low speed or subsonic and transonic operation that the best or most desirable nozzle configuration would be one that has a cylindrical exhaust contour or, more specifically, a construction which provides an annular extension downstream of the primary exhaust nozzle. However, for supersonic or high speed operation, it has been found that the best configuration, from a performance standpoint, would be one which is a converging-diverging nozzle, that is, a construction which provides an expansion surface downstream of the primary exhaust nozzle. The present invention satisfies both of the foregoing requirements by positioning the movable shroud sections in a cylindrical contour at low pressure ratio or subsonic conditions and also during transonic speed conditions. The cylindrical contour is obtained through the mechanism of the pressure differential which exists between the ambient air surrounding the ejector nozzle shroud and the pressure of the primary exhaust gas stream acting on the pivotally connected movable shrouds, the particular geometry of these members permitting them to take the desired positions. Since the ambient pressure at these particular conditions is greater than the pressure of the primary gas stream, the particular geometry of the movable sections is forced into a cylindrical contour. As the pressure of the primary gas stream increases, it acts upon the movable sections which are providing the cylindrical contour and forces the sections radially outward, that is, the cylindrical contour is maintained from a subsonic speed to and during the transonic speeds, until the movable section comes in contact with a stop means which is carried by the fixed nozzle shroud. The stop means is positioned on the fixed shroud member such that it comes in contact with the movable section providing the cylindrical contour at a point which corresponds substantially to a supersonic speed condition; therefore, as the pressure of the primary gas stream continues to increase and continues to exert a force on the movable shroud section, because of the pivotal connections on the movable member, it assumes a convergent-divergent shape thereby providing a convergent-divergent nozzle configuration for supersonic speeds.

BRIEF DESCRIPTION OF THE DRAWINGS

FIG. 1 is a cross-sectional showing through the bottom half of an exhaust nozzle system showing the device of the invention in a subsonic or transonic position.

FIG. 2 is a cross-sectional showing through the top half of an exhaust nozzle system showing the device of the invention in a supersonic position.

DESCRIPTION OF THE PREFERRED EMBODIMENTS

The invention is shown in FIGS. 1 and 2 in the aft end of a gas turbine powerplant. A powerplant to which the ejector nozzle system is particularly adapted is disclosed, for example, in the Savin patent, U.S. Pat No. 2,747,367.

Referring now specifically to FIG. 1, the present invention is illustrated in the subsonic or transonic position. As shown, connected downstream of fuselage or housing 10 are blow-in-doors 12. Blow-in-doors 12 are of a conventional design and may be of the type disclosed in the Hamilton patent, U.S. Pat. No. 3,062,003. Positioned radially inward and spaced therefrom is primary exhaust nozzle 14. Primary exhaust nozzle 14 is concentric about engine centerline 16 and it is through nozzle 14 that the primary exhaust stream from the engine (not shown) is exhausted. Since primary exhaust nozzle 14 is spaced radially from housing 10, it forms passageway 18 therebetween. Passageway 18 is commonly called the secondary passageway for it is gases other than the primary exhaust stream that pass therethrough. The air which passes through secondary passageway 18 may be ram air or may have compressed air from the engine compressor (not shown) added thereto and may or may not include provisions for heating the secondary air by the burning of fuel in passageway 18 by conventional apparatus (not shown).

Primary exhaust nozzle 14 is a variable area type exhaust nozzle, the change in area being accomplished by moving a plurality of flaps 20, which extend circumferentially around the exhaust nozzle 14 and which are pivotally attached at their leading edges 22 to nozzle 14.

Positioned downstream of blow-in-doors 12 and attached to housing 10 by circumferentially spaced struts 24 is shroud housing 30. Shroud housing 30 comprises a fixed shroud section 31 and a plurality of movable shroud sections 34, the fixed section 32 being immediately adjacent to blow-in-doors 12. As illustrated in FIG. 2, blow-in-doors 12 and fixed shroud section 32 form an aerodynamically smooth surface when the blow-in-doors 12 are in the closed or supersonic position. Fixed shroud section 32 also includes stop means 36 positioned at its trailing edge. Stop means 36, whose purpose will hereinafter be described in more detail, is illustrated as a flange 38, which extends radially inward from fixed shroud section 32.

As mentioned hereinbefore, shroud housing 30 includes a plurality of movable shroud sections 34. In the present embodiment, a first, second and third movable section are shown; however, this showing is only illustrated by any number of movable sections being capable of being utilized. As can be seen in FIG. 1 and FIG. 2, first shroud section 40 is pivotally connected at its leading edge 42 to fixed shroud section 32. Second shroud section 44 is connected at its leading edge 46 to the trailing edge 48 of first shroud 40. Third shroud section 50 is connected at its leading edge 52 to fixed shroud section 32, its trailing edge 54 and the trailing edge 56 of the second shroud section having a sliding joint connection 58 therebetween to accommodate any movement. Additionally, as shown, stop means 38 is positioned internally or within the three movable shroud sections.

The operation of the ejector nozzle system will hereinafter be described. During subsonic and transonic operation, the primary exhaust nozzle 14, the blow-in-doors 12 and the shroud housing 30 assume the position as shown in FIG. 1. The exhaust nozzle 14 has been activated by a conventional mechanism (not shown) so that the flaps 20 are in their inner position defining primary exhaust outlet 60 in its minimum area position. In the subsonic and transonic conditions, as free stream air passes over the outer surface of nacelle or housing 10 and blow-in-doors 12, the pressure thereof is greater than the internal static pressure acting on blow-in-doors 12, and, therefore, blow-in-doors 12 are aerodynamically opened to establish free stream ejector passage 62 between blow-in-doors 12 and first movable shroud section 40. Additionally, blow-in-doors 12 cooperate with the primary exhaust nozzle 14 and flaps 20 to constrict or narrow the secondary flow passage 18. It should also be clear that in its present position, shroud section 40 serves as a guide for free stream air entering through blow-in-doors 12. This has the effect of reducing base pressure losses.

It has been determined that during subsonic and transonic conditions, the ejector system which provides the optimum performance is one which has a cylindrical contour. The present invention provides this by utilizing the second shroud section 44 in such a manner that it assumes a cylindrical position around the engine centerline 16 and additionally forms an extension of primary exhaust nozzle 14. In the present embodiment, the mechanism for actuating the movable shroud sections is the pressure differential that exists between the free stream flowing over housing 10 and fixed shroud section 32 and the primary exhaust stream. As hereinbefore noted, the free stream pressure is greater than the static pressure acting on the movable shroud sections, hence the movable shroud sections because of the pivotal connections therebetween assume the positions shown in FIG. 1. Additionally, as the conditions change from subsonic to transonic, the pressure differential is going to change, and hence the position of the movable sections are going to change. Of particular importance, from a performance standpoint, is to maintain second shroud section 44 with a substantially cylindrical exhaust contour. Again this is accomplished through the particular geometry shown and the aerodynamic actuation system employed. More specifically, for a given flight condition, a particular pressure differential exists and hence a particular and predetermined exhaust configuration will be provided. In essence, the present invention provides an automatic ejector system which assumes a particular configuration as a function of flight condition. It should also be clear that varying the position of the movable shroud sections can be obtained through a mechanical or pneumatic actuation system.

As the vehicle proceeds from subsonic to transonic conditions, second shroud section 44 maintains a substantially cylindrical exhaust contour, this being illustrated on FIG. 1 by the reference characters A, A', A" and B. As the vehicle reaches supersonic conditions, the ejector system assumes the position shown in FIG. 2. That is, flaps 20 of primary exhaust nozzle 14 are actuated to the maximum area position so that primary exhaust outlet 60 is in its maximum area condition. Blow-in-doors 12 are actuated aerodynamically to a closed position and with fixed section 32 forms an aerodynamically smooth surface and extension of secondary flow passageway 18.

Additionally, the movable shroud sections have aerodynamically actuated to the position shown so as to form a convergent-divergent exhaust configuration. More specifically, first shroud section 40 and fixed section 32 form the convergent portion while second shroud section 44 and third shroud section 50 form the divergent section on which the exhaust gases act. This obviously is the most desirable exhaust configuration for supersonic conditions. It is in moving from transonic conditions to supersonic conditions that stop means 36 is utilized. As hereinbefore mentioned, stop means 36 comprises a radially extending flange 38 which is positioned such that it cooperates with second shroud member 44 when the vehicle is changing from a transonic to supersonic condition. Therefore, since flange 38 is a fixed or rigid member and because of the pivotal connections and sliding joint connection between the movable shroud sections, the shroud housing 30 assumes a convergent-divergent nozzle configuration. It should therefore be clear that the present invention provides the optimum nozzle configuration over an entire flight regime.

What is claimed is:

1. An ejector exhaust nozzle for use in a gas turbine engine, the engine having a housing, a variable area primary exhaust nozzle positioned within the housing, a flow passage for secondary air being formed therebetween, a plurality of flaps, each of the flaps being pivotally attached to the engine housing, the flaps being movable radially inward to an open position whereby the flaps cooperate with the primary nozzle to constrict the secondary flow passage and radially outward to a closed position whereby the flaps cooperate with the housing to define a smooth aerodynamic surface constituting an extension of the secondary flow passage wherein the improvement comprises:

a shroud housing consisting of a fixed section and a plurality of movable sections and means for attaching and supporting the shroud housing to the engine;

means for actuating the movable shroud sections, the geometry and attachment of the movable shroud sections being such as to permit one of the movable sections to define a substantially cylindrical smooth aerodynamic extension of the variable area primary nozzle, this cylindrical extension being provided over a range of movement of the movable sections by the actuating means; and stop means cooperating with the movable shroud sections when the movable shroud sections are moved outwardly, the stop means causing the movable shroud sections to move from a substantially cylindrical extension to a convergent-divergent nozzle at a predetermined engine operating condition.

2. An ejector exhaust nozzle as in claim 1 wherein; the means for actuating the movable shroud sections is the pressure differential, existing at different engine operating conditions, between the ambient pressure surrounding the engine and shroud housing and the pressure of the stream exhausting from the primary nozzle and within the shroud housing.

3. An ejector exhaust nozzle as in claim 1 wherein; the stop means cooperates with the movable sections and causes them to begin assuming a convergent-divergent position when the engine reaches a supersonic operating condition.

4. An ejector nozzle system for a gas stream which provides optimum performance over all levels of a flight regime comprising:

a nozzle housing including a fixed shroud section, a plurality of movable shroud sections, at least two of the movable sections pivotally connected to the fixed shroud section, at least one of the movable sections forming a cylindrical exhaust contour for the gas stream over a first portion of the flight regime, and at least one other movable section cooperating with the movable section forming the cylindrical contour to form a convergent-divergent exhaust configuration over a second portion of the flight regime;

means for actuating the movable shroud sections; and stop means causing the movable shroud sections to move from a cylindrical contour to a convergent-divergent configuration.

5. An ejector nozzle system as in claim 4 wherein;

the means for actuating the movable shroud sections is the pressure differential existing between the ambient pressure surrounding the nozzle housing and the pressure of the gas stream, the pressure of the gas stream being higher within the gas stream than the ambient pressure causing the movable sections to assume the convergent-divergent position, and the pressure of the gas stream being lower than the ambient pressure hence causing the movable sections to assume a cylindrical contour configuration.

6. A construction as in claim 4 wherein;

the stop means is a flange extending radially inward from the fixed shroud section.

7. A construction as in claim 6 wherein;

there are three movable shroud sections, a first shroud section pivotally connected at its leading edge to the fixed shroud and pivotally connected to a second shroud section at its trailing edge, and a third shroud section pivotally connected at its leading edge to the fixed shroud section, the trailing edge of the third shroud and the trailing edge of the second shroud having a sliding joint connection therebetween.

References Cited

UNITED STATES PATENTS

| | | | |
|---|---|---|---|
| 2,926,491 | 3/1960 | Hyde | 239—265.41 |
| 3,057,150 | 10/1962 | Horgan | 239—265.41 |
| 3,062,003 | 11/1962 | Hamilton | 239—127.3 |
| 3,302,889 | 2/1967 | Di Sabato | 239—265.39 |
| 3,346,193 | 10/1967 | Tunicki | 239—265.41 |
| 3,367,579 | 2/1968 | Mehr | 239—265.39 |
| 3,386,658 | 6/1968 | Mehr | 239—127.3 |
| 3,454,227 | 7/1969 | Motycka | 239—265.39 |

LLOYD L. KING, Primary Examiner